United States Patent
Windheim et al.

(10) Patent No.: US 7,302,693 B2
(45) Date of Patent: *Nov. 27, 2007

(54) REMOTE CONTROL INPUTS TO JAVA APPLICATIONS

(75) Inventors: Brian L. Windheim, Hillsboro, OR (US); Alok Prakash, Beaverton, OR (US); Subha Pathial, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 1055 days.

This patent is subject to a terminal disclaimer.

(21) Appl. No.: 10/392,177

(22) Filed: Mar. 20, 2003

(65) Prior Publication Data

US 2004/0031041 A1    Feb. 12, 2004

Related U.S. Application Data

(63) Continuation of application No. 09/201,902, filed on Nov. 30, 1998, now Pat. No. 6,539,437.

(51) Int. Cl.
    *G06F 9/46* (2006.01)
(52) U.S. Cl. ............ 719/330; 719/310; 719/318; 719/321; 348/552; 455/3.06; 709/201
(58) Field of Classification Search ........ 719/310–332; 455/1–575.9; 348/14.01–844; 709/200–252
    See application file for complete search history.

(56) References Cited

U.S. PATENT DOCUMENTS

| | | | | |
|---|---|---|---|---|
| 5,436,960 A | * | 7/1995 | Campana et al. ........ | 455/412.1 |
| 5,574,964 A | * | 11/1996 | Hamlin ........................ | 725/78 |
| 5,594,779 A | * | 1/1997 | Goodman .................. | 455/3.04 |
| 5,619,274 A | * | 4/1997 | Roop et al. ................. | 348/461 |
| 5,694,455 A | * | 12/1997 | Goodman .................... | 455/413 |
| 5,727,159 A | * | 3/1998 | Kikinis ....................... | 709/246 |
| 5,745,551 A | * | 4/1998 | Strauch et al. .............. | 455/413 |
| 5,774,063 A | * | 6/1998 | Berry et al. ............ | 340/825.69 |
| 5,909,545 A | * | 6/1999 | Frese, II et al. ............ | 709/208 |
| 5,930,742 A | * | 7/1999 | Dodd et al. ................. | 702/158 |
| 5,940,074 A | * | 8/1999 | Britt et al. .................. | 715/749 |
| 5,948,084 A | * | 9/1999 | Ha ............................. | 710/73 |
| 6,049,333 A | * | 4/2000 | LaJoie et al. ............... | 715/718 |
| 6,098,106 A | * | 8/2000 | Philyaw et al. ............. | 709/238 |
| 6,104,334 A | * | 8/2000 | Allport ....................... | 341/175 |
| 6,137,539 A | * | 10/2000 | Lownes et al. ............. | 348/569 |
| 6,163,316 A | * | 12/2000 | Killian ....................... | 715/721 |

(Continued)

OTHER PUBLICATIONS

Kale, L. V. et al "Design and Implementation of Parallel Java with Global Object Space." Jul. 1997.*

(Continued)

*Primary Examiner*—Lewis A. Bullock, Jr.
(74) *Attorney, Agent, or Firm*—Michael R. Barre

(57) ABSTRACT

A method of delivering input from a device's remote control to a Java™ application uses asynchronous method invocation in a processing device. The input from the remote control is captured in system-specific (native) code and delivered to a Java™ application asynchronously. This is achieved by calling an event method in the Java™ application in response to the received input signals. The event method is then executed to transfer the input signals from the remote control.

37 Claims, 12 Drawing Sheets

U.S. PATENT DOCUMENTS

| | | | |
|---|---|---|---|
| 6,167,253 A * | 12/2000 | Farris et al. | 455/412.2 |
| 6,167,441 A * | 12/2000 | Himmel | 709/217 |
| 6,205,318 B1 * | 3/2001 | Schindler et al. | 455/3.06 |
| 6,216,013 B1 * | 4/2001 | Moore et al. | 455/557 |
| 6,229,532 B1 * | 5/2001 | Fujii | 715/733 |
| 6,286,003 B1 * | 9/2001 | Muta | 707/10 |
| 6,286,008 B1 * | 9/2001 | Matsumoto et al. | 707/102 |
| 6,338,434 B1 * | 1/2002 | Wilz et al. | 235/462.01 |
| 6,346,934 B1 * | 2/2002 | Wugofski | 345/158 |
| 6,360,275 B1 * | 3/2002 | Chu et al. | 709/245 |
| 6,418,310 B1 * | 7/2002 | Dent | 455/418 |
| 6,430,409 B1 * | 8/2002 | Rossmann | 455/422.1 |
| 6,463,299 B1 * | 10/2002 | Macor | 455/556.1 |

OTHER PUBLICATIONS

Sun Microsystems. "Java Native Interface Specification." May 16, 1997.*

Bissell et al. "The set-top box for interactive services." BT JournalJ. vol. 13, No. 4, Oct. 1995.*

Sun Microsystems. "Personal Java Technology White Paper." Aug. 1998.*

Phillips Business Information. "Joining Television and the Internet Using Java." Internet Week. Apr. 1, 1996.*

* cited by examiner

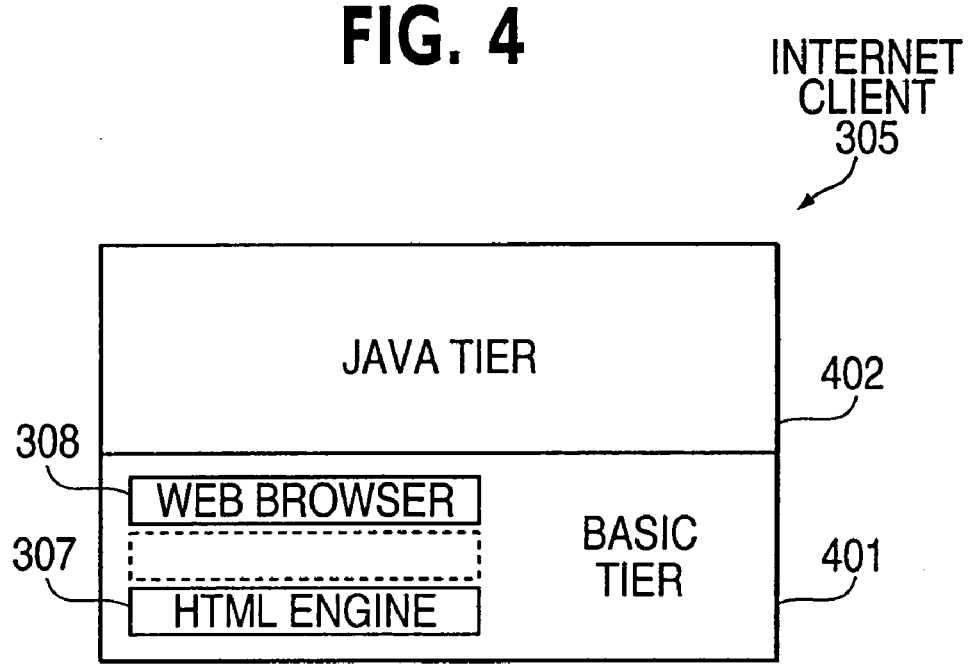
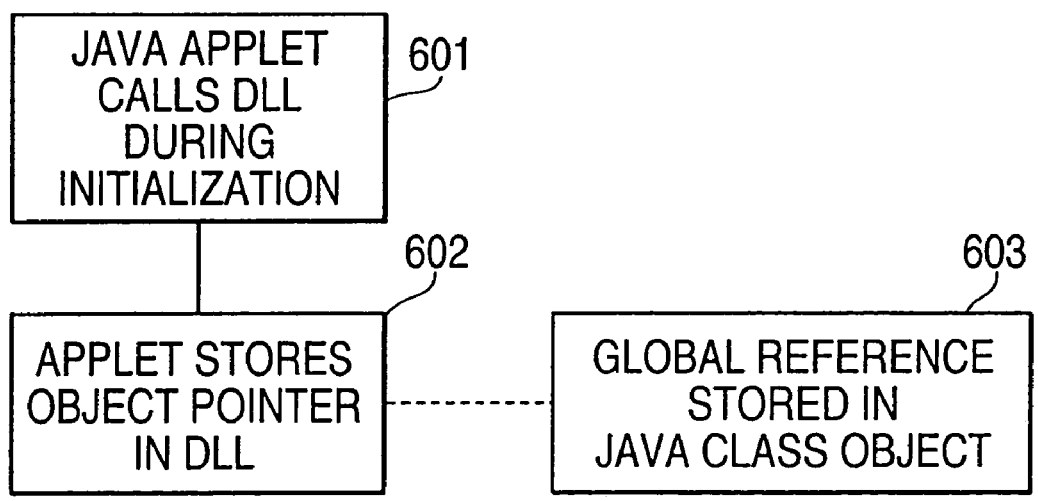

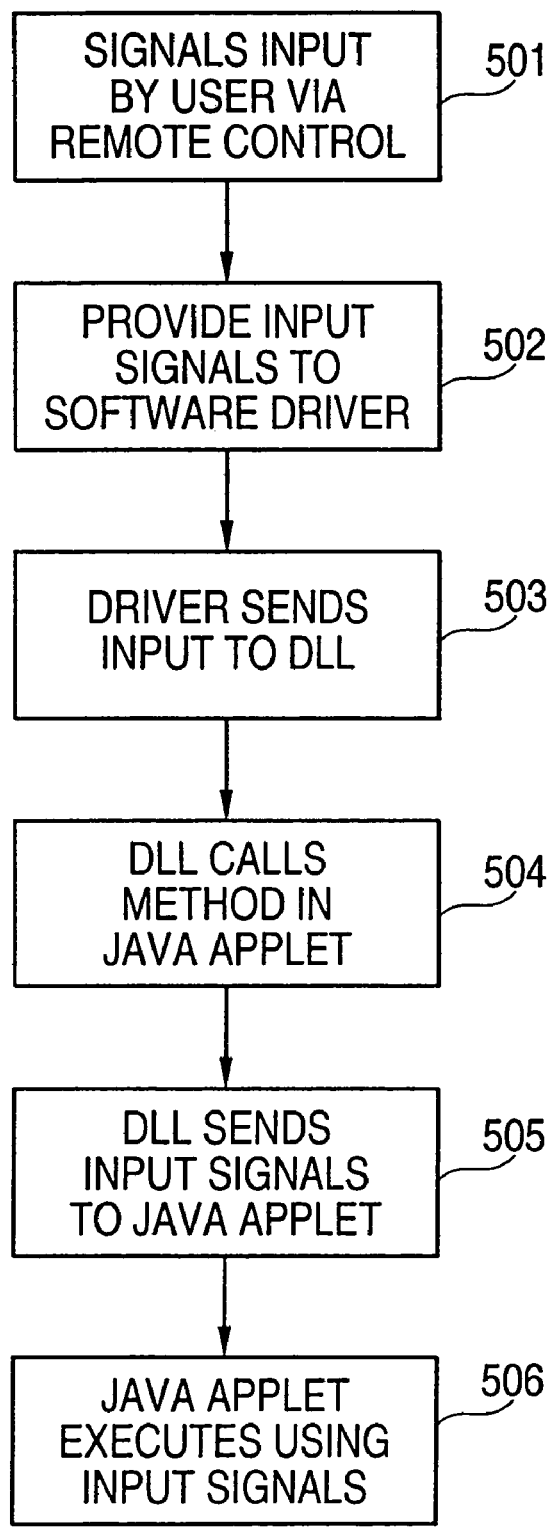

FIG. 7a

```c
#include <windows.h>
#include <assert.h>
#include "rctl.h"
#include "remotethread.h"
#include "myjremote.h"

void HandleRemoteEvent(JRIEnv* env, struct RemoteThread* self,
int i);

MSG msg;
char str[80];

BOOL WINAPI DllMain(HINSTANCE hDLLInst, DWORD fdwReason, LPVOID
lpvReserved)
{
    hInst = hDLLInst;
    switch (fdwReason)
    {
        case DLL_PROCESS_ATTACH:
            {
                break;
            }
        case DLL_PROCESS_DETACH:
            {
                if (m_hRctl)
                {
                    RCTLDisableNotif (m_hRCKeyNotif);   //
disable key notification
                    RCTLDisableNotif (m_hRCModeNotif);  //
disable mode notification
                    RCTLClose();    // close remote device
driver
                } break;
            }
        case DLL_THREAD_ATTACH:
            break;

case DLL_THREAD_DETACH:
            break;
    }
    return TRUE;
} int CreateReceiverWindow()
{
    wc.lpszClassName = "RemoteControlReceiverClass";
    wc.lpfnWndProc = MainWndProc;
    wc.style = CS_OWNDC | CS_VREDRAW | CS_HREDRAW;
    wc.hInstance = hInst;
```

FIG. 7b

```
wc.hIcon = NULL;
wc.hCursor = NULL;
wc.hbrBackground = (HBRUSH)( COLOR_WINDOW+1 );
wc.lpszMenuName = NULL;
wc.cbClsExtra = 0;
wc.cbWndExtra = 0;
RegisterClass( &wc );

Remote_hWnd = CreateWindow(
    "RemoteControlReceiverClass",
    "",
    WS_CHILD|WS_VISIBLE,
    -1,
    -1,
    1,
    1,
    GetDesktopWindow(),
    NULL,
    hInst,
    NULL
    );

if (Remote_hWnd)
{
    ShowWindow(Remote_hWnd,SW_SHOW);
    return 1;
}
else
{
    MessageBox(NULL,"No Window","Ha",MB_OK);
} return 0;
} int __declspec(dllexport) FAR PASCAL RemoteInitialize()
{
    int nStatus;

if (!CreateReceiverWindow())
    {
        return 0;
    } m_hRctl = 0;    // set to null for first time enumerate
    m_hRCModeNotif = 0;
    m_hRCKeyNotif = 0;
    m_hConnectNotif = 0;

// Open the LogiMedia driver by calling the RCTLOpen
function
```

FIG. 7c

```
if ((nStatus = RCTLOpen()) != RCTLS_SUCCESS)
{
    MessageBox(NULL,"Not open","Fata",MB_OK);
    return nStatus;
}

// Obtain a handle to the first remote control device by
calling the RCTLEnumDevices function
    if (RCTLEnumDevices (&m_hRctl) != RCTLS_SUCCESS)
    {
        MessageBox(NULL,"No enum devices","Fata",MB_OK);
        return RCTLS_FAIL;
    }
    RCTLGetDeviceInfo(m_hRctl, RCTLGI_DEVICE_MODEL,
m_szDeviceModel);
//      MessageBox(NULL,"After GetDeviceInfo","Fata",MB_OK);

/* Enabling key notification is done by calling the
RCTLEnableDeviceNotif function. The parameters
    that are passed to this function are the following:
    1. Handle to remote control obtained from RCTLEnumDevices,
    2. Window handle of the window to be notified
    3. Window message to be sent to the notification window
identified above
    4. Notification type selector (i.e KeyCode, ScanCode, Mode
etc.,)
    5. Notification flags. For keycode notification, specify the
mode in which notification is enabled.
    6. Pointer to notification handle. This handle is used by
the application to disable the notification.
*/
    if (RCTLEnableDeviceNotif(
            m_hRctl,
            Remote_hWnd,
            WM_KEYCODE,
            RCTLM_KEY,
            RCTL_ALL,
            &m_hRCKeyNotif) != RCTLS_SUCCESS)
    {
        MessageBox(NULL,"Not enable notif","Fata",MB_OK);
        return RCTLS_CANNOT_ENABLE_DEVICE_NOTIF;
    }

//  MessageBox(NULL,"OK","Fata nahi",MB_OK);
    return RCTLS_SUCCESS;
} int __declspec(dllexport) FAR PASCAL RemoteUnInitialize()
{
    RCTLDisableNotif (m_hRCKeyNotif);   // disable key
notification
    RCTLDisableNotif (m_hRCModeNotif);  // disable mode
notification
```

FIG. 7d

```
        RCTLClose();    // close remote device driver
        DestroyWindow(Remote_hWnd);
        return 1;
}

LRESULT CALLBACK MainWndProc(HWND hWnd, UINT msg, WPARAM wParam,
LPARAM lParam)
{
        PAINTSTRUCT ps;
        HDC hDC;
        static BOOL x=0;

switch( msg )
        {
        case WM_KEYCODE:
        case WM_MODE:
        case WM_TVKEYCODE:
        case WM_CDKEYCODE:
        case WM_MESSAGEKEYCODE:
        case WM_WEBKEYCODE:

break;
        case WM_PAINT:
                hDC = BeginPaint( hWnd, &ps );
                EndPaint( hWnd, &ps );
                break;

/*******************************************************\
 *      Let the default window proc handle all other messages
 *
\*******************************************************/ default:
                return( DefWindowProc( hWnd, msg, wParam, lParam ));
        } return 0;
}

// JRI starts here......

JRI_PUBLIC_API(jint)
native_RemoteThread_RemoteInitialize(JRIEnv* env, struct
RemoteThread* self)
{
        return (long) RemoteInitialize();

```
JRI_PUBLIC_API(jint)
native_RemoteThread_RemoteUnInitialize(JRIEnv* env, struct
RemoteThread* self)
{
      return (long) RemoteUnInitialize();

}

JRI_PUBLIC_API(jint)
native_RemoteThread_RemoteFlushMessages(JRIEnv* env, struct
RemoteThread* self)
{ while (PeekMessage(&msg, NULL, 0, 0, PM_REMOVE|PM_NOYIELD))
      {
            if(msg.hwnd == Remote_hWnd)
            {
                  if((msg.message >= WM_KEYCODE) && (msg.message <=
WM_PHONEKEYCODE))
                  {

HandleRemoteEvent( env, self,
msg.wParam);
//                        MessageBox(NULL,"Ha","Ha", MB_OK);
                  }
                  else
                        SendMessage(msg.hwnd,
msg.message,msg.wParam,msg.lParam);
            }
            else
                  SendMessage(msg.hwnd,
msg.message,msg.wParam,msg.lParam);

}
      return(1);

} void HandleRemoteEvent(JRIEnv* env, struct RemoteThread* self,
int i)
{
      use_RemoteThread(env);
      RemoteThread_HandleRemoteKeys(env,self, i);
      unuse_RemoteThread(env);
}
```

FIG. 8a

```java
import java.lang.*;
import java.awt.*;
import java.applet.Applet;
import netscape.javascript.JSObject;

public class JRemote extends Applet
{
    RemoteThread RThread;
    JSObject win;
    String statusStr;
     public void init()
     {
         //{{INIT_CONTROLS
         setLayout(new FlowLayout(FlowLayout.CENTER,5,5));
         setSize(0,0);
         //}}
     //{{DECLARE_CONTROLS
     //}}
}
  public void HandleRemoteKeys(int i)
  {
        statusStr = Integer.toString(i);
        repaint();

Integer RemoteKey[];
    RemoteKey = new Integer[1];
    RemoteKey[0] = new Integer(i);
    try{
        win = JSObject.getWindow(this);
        win.call("RemoteKey", RemoteKey);
    }catch (Exception e){
        // Don't throw exception information away, print it.
        e.printStackTrace();
        }
  } public void start()
    {
        RThread = new RemoteThread(this);
        RThread.start();
    } public void destroy()
    {
        RThread.stop1();
    } public void stop()
    {
        RThread.stop1();
    } public void paint (Graphics g)
```

FIG. 8b

```
   {
    g.drawString (statusStr, 50, 10);
   }
 }
```

REMOTE CONTROL INPUTS TO JAVA APPLICATIONS

CROSS-REFERENCE TO RELATED APPLICATIONS

This application is a Continuation of U.S. patent application Ser. No. 09/201,902, entitled "Remote Control Inputs To Java Applications," naming inventors Brian L. Windheim et al., filed on Nov. 30, 1998, and issued on Mar. 25, 2003 as U.S. Pat. No. 6,539,437.

BACKGROUND OF THE INVENTION

1. Field of the Invention

This invention relates generally to methods of delivering input signals from a remote control to a Java application. In particular, the present invention relates to methods of performing a process in response to remote control inputs provided to a device by forwarding the remote control inputs from the hardware and operating system software of the device to the Java application.

2. Description of the Related Art

Many modern devices rely in great part on real-time embedded software systems. Some of these devices operate in distributed communication environments in which they must be compatible with other devices and networks. As one example, cable boxes in cable television networks have become increasingly sophisticated and the current generation of cable boxes, now generally referred to as set-top boxes (STB) or digital entertainment terminals (DET), include advanced computer-like capabilities. See, for example, U.S. Pat. No. 5,635,979.

This convergence of video and computer technologies creates novel problems. For example, users of cable boxes are accustomed to using infrared remote control devices to perform simple television functions such as changing the channel, volume, etc. Moreover, they are accustomed to having their selected functions performed without delay. The modern compression and encryption techniques used in set-top boxes cause even relatively routine functions such as changing channels to require extensive processing, which in turn causes noticeable delays from the time the function is requested. See, for example, U.S. Pat. No. 5,477,263.

The problems of convergence are more exacerbated in more sophisticated set-top boxes. For example, in the integration of cable modems and internet access (i.e., web browser software) into set-top boxes and other devices, it is desired to support a host of related technologies such as the Intel Intercast™ technology for including internet data within the vertical blanking interval of a television signal and also the JavaScript™ scripting language for HTML.

Java™ is an especially attractive programming language when developing software applications because it is designed to enable the development of one "applet" which can run stand-alone in a variety of devices having different central processing units and operating system architectures. However, the present versions of Java™ available from Sun Microsystems or Microsoft is designed to receive input signals only from a standard computer keyboard and mouse. Java™ applets cannot directly receive input from an infrared remote control. While a Java™ applet could theoretically carry out repeated polling to ascertain the presence of remote control inputs, such a method can be problematic. There is always a maximum latency equal to the time delay between subsequent polls. If polling is carried out at a high frequency to reduce latency, there may be a large number of polling queries between actual remote control inputs. In a video-on-demand application where the user may not provide any inputs during the entire length of a movie, the resulting large number of polls may waste valuable processing resources. Thus, known polling methods are unsatisfactory for delivering remote control inputs to Java™ applications.

SUMMARY OF THE INVENTION

The present invention is directed to a method of delivering remote control input signals to Java applications. In a first aspect of the invention, the method includes the steps of receiving the input signals of the remote control in a receiver of the processing device, holding the received input signals in system-specific native code of the processing device and calling an event method in the Java™ application in response to the received input signals. The event method is then executed to transfer the input signals from the native code to the Java™ application.

BRIEF DESCRIPTION OF THE DRAWINGS

FIG. 4 is an exemplary diagram illustrating the internet client software 305 of FIG. 3.

FIG. 5 is an exemplary diagram showing the process steps of an exemplary embodiment of the method of the present invention applied to the set-top box shown in FIG. 2.

FIG. 6 is an exemplary diagram showing the steps in installing the remote control interface in the preferred, exemplary embodiment of the invention.

FIGS. 7a-7e show an exemplary program listing of a file that implements a DLL which is the interface between the remote control and the high-level Java™ applet.

FIGS. 8a and 8b show an exemplary program listing of a file that implements a Java™ applet class that interfaces between JavaScript code on an HTML page and the DLL implemented by the file shown in FIGS. 7a-7e.

DETAILED DESCRIPTION

The present invention is directed to a method of using a Java™ applet to implement a real-time process that is responsive to input from an input device not directly supported by the Java™ programming language such as an infrared remote control input device. For the purposes of this application, Java: refers to any version of Java™, whether presently existing or hereafter developed.

Figure 1:
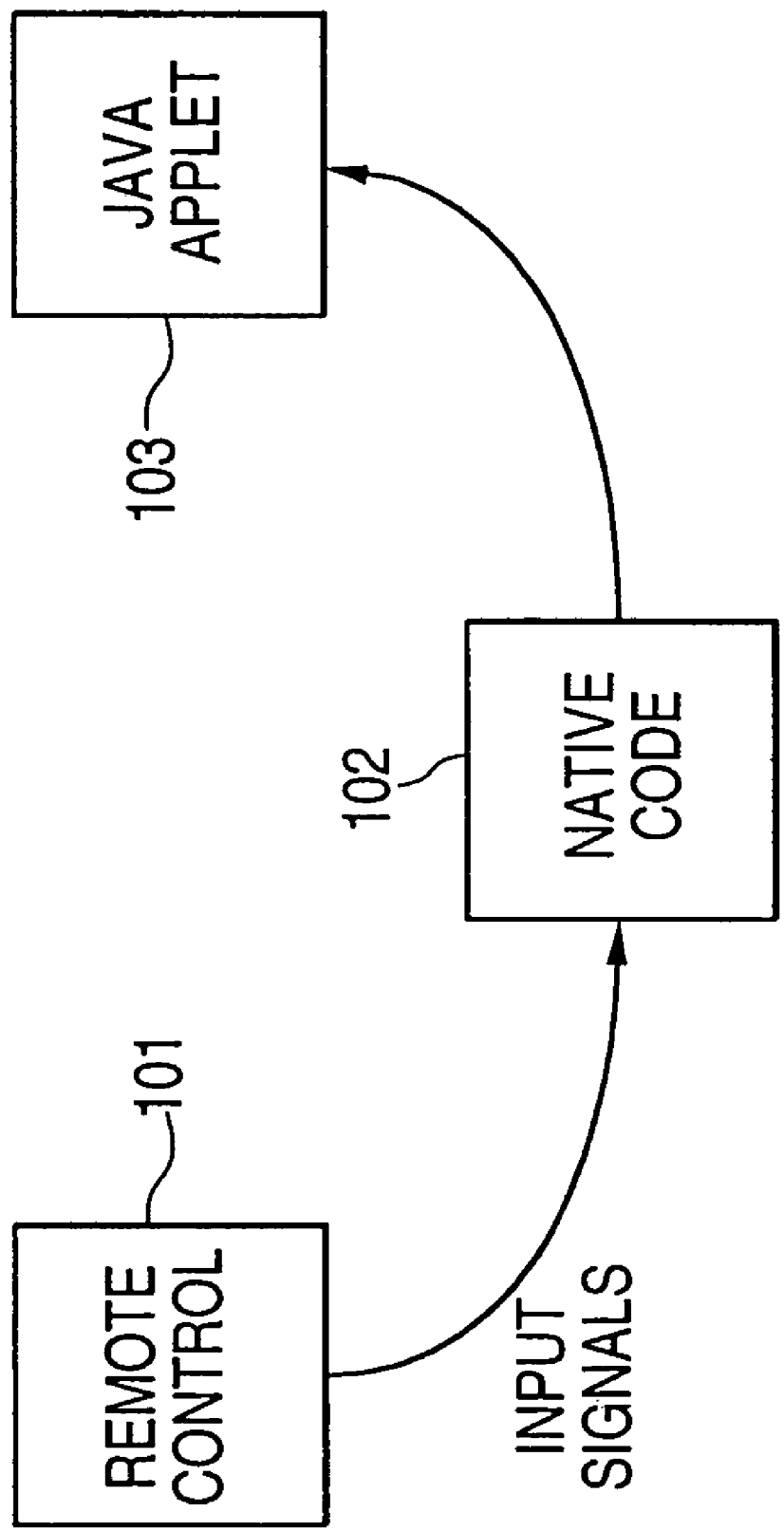
FIG. 1 is a generalized block diagram providing a basic illustration of an exemplary method of the present invention.

A simple representation of an exemplary method is provided in FIG. 1. The first step of the method is that of delivering remote control input from remote control hardware 101 (e.g., a hand-held remote control) to native code 102. In the second step, native code 102 calls on a method in Java™ applet 103 in response to the remote control inputs using the Java™ Native Interface (JNI). The input signals are then transferred to Java™ applet 103 which executes its respective application in response to the input signals.

Figure 2:
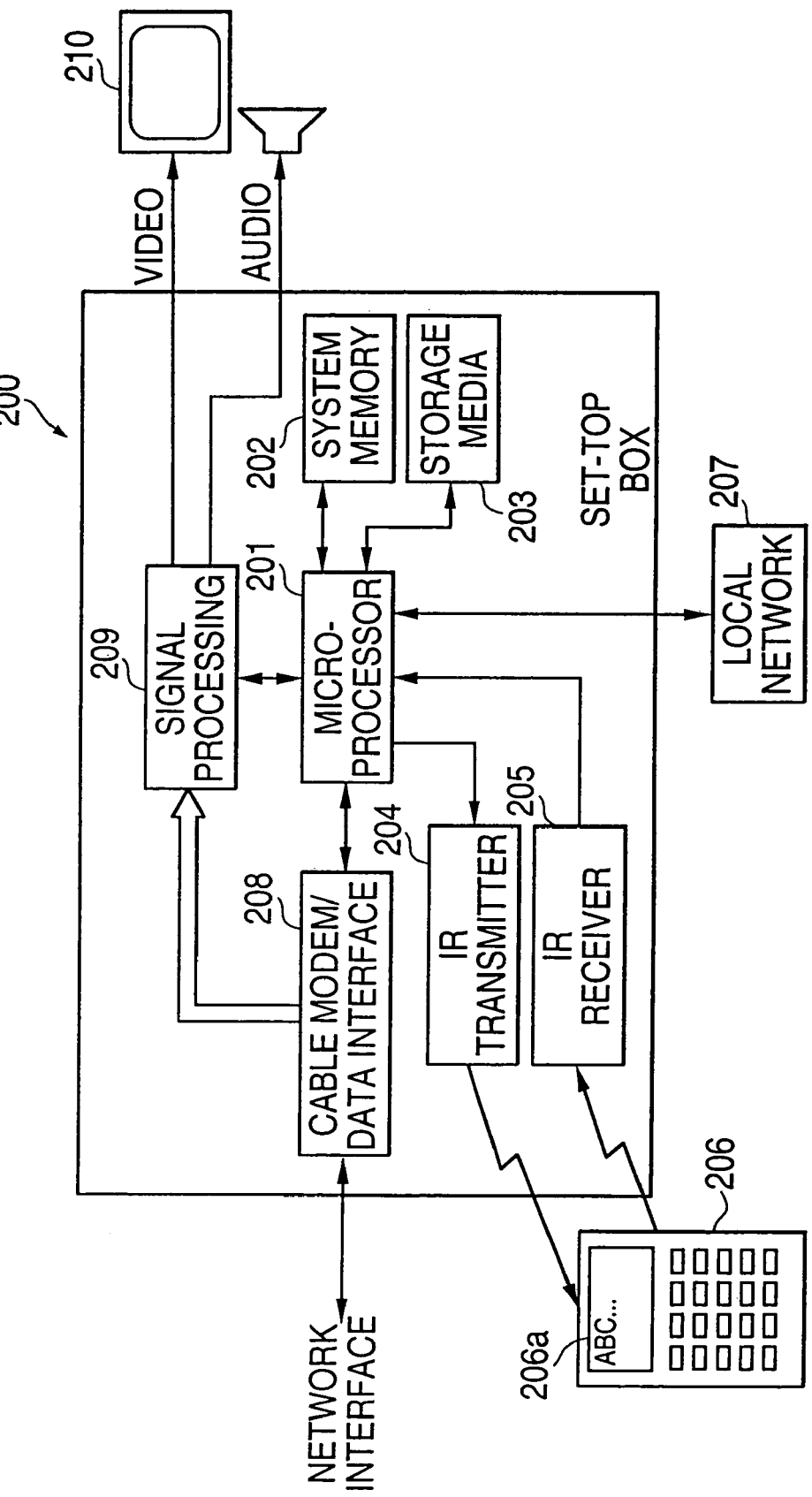
FIG. 2 is a diagram illustrating the key hardware components of a set-top box according to an exemplary embodiment of the invention.

The method of the present invention is preferably implemented in a network terminal device accepting both video and internet data. Exemplary devices are a set-top box or digital entertainment terminal used for cable television services and a suitably configured and programmed personal computer (PC), whether the PC is a desktop computer, laptop computer or network computer. Of course, the method may also be implemented in any adaptation, hybrid, or evolution of one or more of these devices. FIG. 2 is an exemplary diagram illustrating the key functional elements of an exemplary set-top box.

Set-top box (STB) 200 in FIG. 2 includes at least one microprocessor 201, such as the Intel Celeron™ or Pentium II™ microprocessors, and associated system memory 202, which can include cache memory, both volatile and non-volatile random access memory, as well as permanently installed mass storage media such as a hard disk drive. STB 200 may also include removable storage media 203 such as a DVD drive, etc.

The input/output interfaces can include at least an infrared transmitter 204 and an infrared receiver 205 for transferring signals to and from an external infrared remote control device 206. IR transmitter 204 and IR receiver 205 can utilize different signal code sets which are updated or downloaded into STB 200. They can also utilize a set of external emitters connected to an IR port (not shown) for "hide-away" placement of STB 200.

Remote control 206 can be a universal remote—user selectable in four control modes: Cable, TV, VCR and AUX, and programmable to accommodate various code sets. It can contain any combination or all of the following keys: Cable, TV, VCR, AUX, Digits 0-9, Power, Channel Up, Channel Down, Volume Up, Volume Down, Mute, Last, Favorite, Lock, Menu, Guide, Information, Help, OK, Up, Down, Right, Left, Page Forward, Page Backward, and Music. Optionally, remote control 206 is bi-directional so that it can both send input signals to infrared receiver 205 and receive and display information from infrared transmitter 206 on LCD display 206a. The displayed information may be either text or graphic based. An exemplary use of the remote control display 206a is to show the mode STB 200 is operating in, or, for example, title information from a DVD player internal or external to STB 200. Remote control 206 is preferably capable of storing several lines of text and displaying several lines of text and of scrolling the displayed text.

The complete external interface between STB 200 and a digital cable network or a hybrid analog/digital cable network occurs over a coaxial cable connection through data interface/cable modem 208. The architecture and protocols for carrying data and control streams can be defined by an associated Network Interface (NI). The network interface preferably supports both data only services and combined video/data services, in particular, the transfer of internet or other network data as well as video. Regardless of the environment, it should be understood that the network and data interface/cable modem may be of any architecture, using any currently existing or later developed technology. The received data is processed in data processing circuitry 209 under control of microprocessor 201 and output to a display device such as a standard television or computer monitor 210.

STB 200 may also be connected to a local network 207. Local network 207 may include any number of digital systems such as other set-top boxes, personal computers, DVD players, recording devices, etc.

Figure 3:
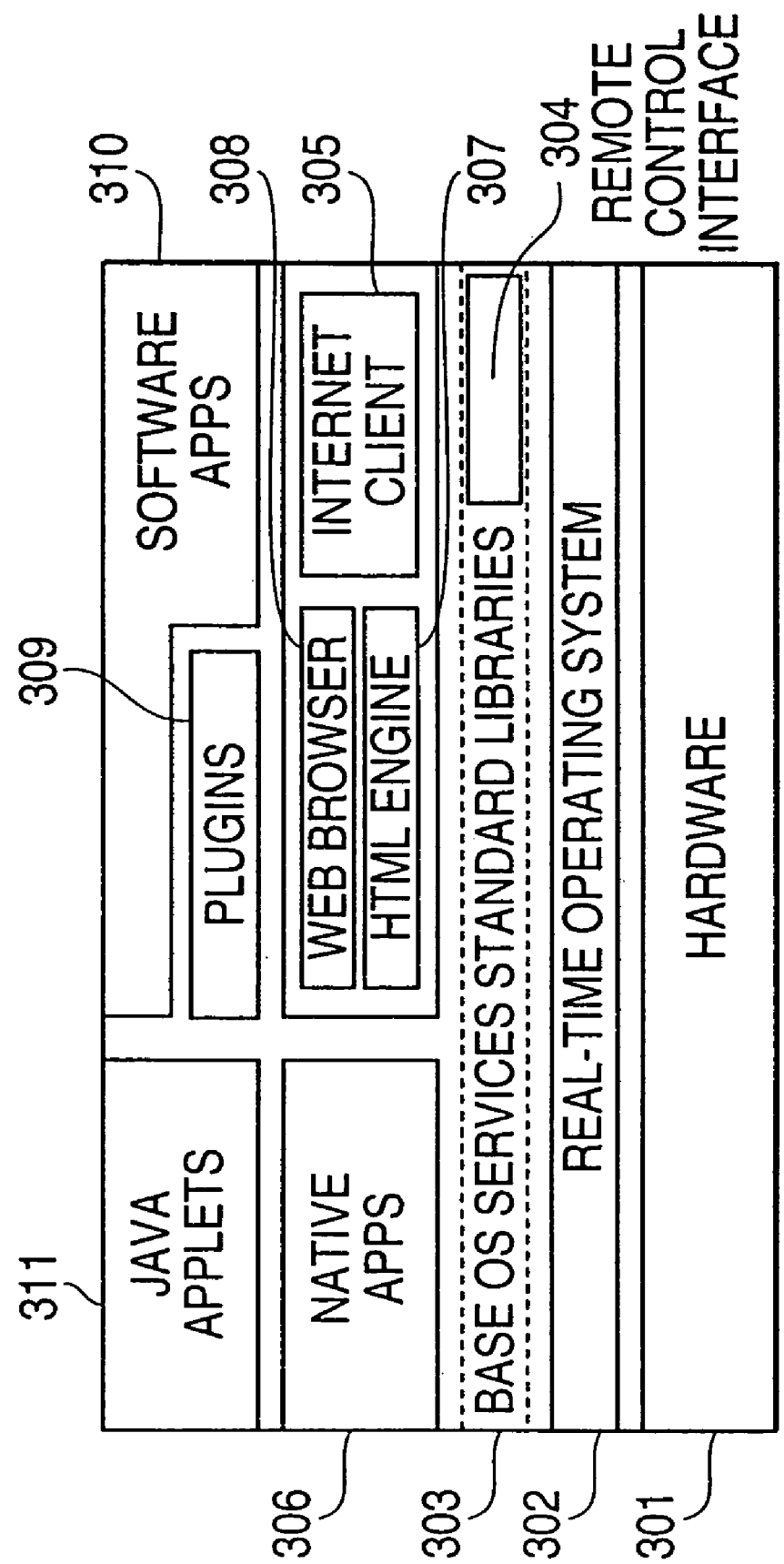
FIG. 3 is an exemplary diagram useful in explaining the software architecture of the set-top box in FIG. 2.

FIG. 3 illustrates an exemplary software architecture for the set-top box in FIG. 2. Associated with hardware 301 (consisting of the afore-mentioned components shown in FIG. 1) is real-time operating system (RTOS) 302. RTOS 302 may be a commercially available operating system, such as Microsoft Windows CE™, or a custom designed operating system.

As known in the art, there is an application programming interface (APIs) 303 which interrelate RTOS 302 with applications software. API 303 can include two sets of services that allow those applications to be implemented. Base OS Services, such as scheduling, virtual memory, multithreading, etc., are services that are provided to almost all applications without much effort on the programmer's part. OS Standard Libraries are predefined code modules that application developers are encouraged to use when implementing a functionality supported by RTOS 302. For example, almost all application developers are encouraged to use the OS GUI libraries, etc.

One interface particularly important to the present invention is the remote control interface 304. This interface is written in native code so that it is globally available to all applications, including Java™ applications. It allows a input software driver in an application to receive input from infrared receiver 204. The receiver software driver operates in accordance with a preselected code set of the respective application to receive the input and then capture it in native code.

In addition to native applications 306, internet client 305 is a software platform installed on top of RTOS 302 for running Internet standard applications, including HTML, JavaScript™ from Sun Microsoft, Java™, JPEC, HTTP, Transmission Command Protocol/Internet Protocol (TCP/IP), etc.

It can utilize existing Internet content standards, which in turn allows STB 200 to be used with any standard Internet content development tool. Internet client 305 may be tiered into defined subsets of TV-oriented additions or extensions to the existing Internet standards to enable additional content and functionality. These additions or extensions preferably include: TV-oriented additions to HTML, JavaScript™ and Java™ which allow for the overlay of HTML on TV, the positioning of a TV picture within an HTML page, setting/changing the channel, changing/muting the volume, etc.; new TV-centric MIME data formats, such as EPG-data; and support for Video on Demand. In particular, internet client 305 can enable tagging and synchronization methods for activating interactive HTML content coincident with related TV programming, such as with Intel Intercast™ technology which provides data in the vertical blanking interval (VBI) of a television signal.

An exemplary division of internet client 305 into tiers is illustrated in FIG. 4. Basic Tier 401 provides an exemplary base-level lowest common denominator for STB 200. It may consist of: an HyperText Markup Language (HTML) engine 307 with enhanced TV extensions; JavaScript with enhanced TV extensions; and a standard set of MIME types for images, sound and animation. There are at least two modes for the HTML engine application: an active applications mode, in which the actions of the engine are directed by user input, and a passive web browser mode 308 which displays the HTML pages that it receives without user interaction.

An especially important feature of the exemplary embodiment is Java™ Tier 402, which adds Java™, JavaBeans™ and/or Personal Java™ with enhanced TV extensions. The basic interpreter and class support for Java™ tier 402 is only about, for example, 40,000 bytes and the basic standard libraries and thread support are, for example, an additional 175,000 bytes. The compiler is written in Java™ and the runtime is written in ANSI C with a clean POSIX portability boundary. The libraries define portable interfaces. For example, there is an abstract Window class and implementations of it for Unix, Windows and Macintosh. Java™ tier 402 also has an extensive library of routines for coping easily with TCP/IP protocols like HTTP and FTP. Thus, Java™ applications in STB 200 can open and access internet objects with the same ease as they can local file systems.

The enhanced TV extensions in Java™ tier 402 are a harmonious set of, optionally backwards-compatible additions to HTML, JavaScript and Java™ to add TV-oriented functionality. These extensions can add the ability to access the full set of program and system information defined by the ATSC Standard T3/S8 including; data acquisition, decoding of standardized data structures such as MPEG-2 video, and access to application/vendor-specific data structures. They also add the ability to control the setting of the digital or analog video tuner(s) and the ability to control the size and placement of the video signal(s) as well as the ability to control how interactive and video content are overlaid. Further details of Java™ tier 402 are discussed, infra, in the discussion of the method for delivering input signals to an applet in Java™ tier 402.

In returning discussion to FIG. 3, functionality is added to internet client 305 via client plug-ins 309. Various client plug-in APIs are used by software applications and networks to extend the base functionality of the client browser. For example, while most of an EPG application client can be created with HTML and JavaScript, a plug-in may be needed for accessing the compressed EPG data. There may be two tiers of plug-in APIs. These are preferably loaded and unloaded at run-time to optimize memory use and flexibility.

First, there may be a conventional C/C++ application programming interface (API) for compiled code plug-ins. Preferably, it closely follows the Netscape 3.0 plug-in API and can be used in set-top boxes without Java™ tier 402. The compiled API may also be used when the plug-in is OS-dependent, hardware-dependent or has performance or other characteristics that require C or C++. Also, a JavaBeans™ mechanism 402 can be used for plug-ins that are designed to be portable across a variety of set-top box architectures. The Java™ Native Interface (JNI) for interacting with the Windows™ operating system from Microsoft Corp. is supplemented with JavaBeans™ for plug-ins. The JavaBeans API includes a mechanism to wrap existing Compiled plug-ins for access by Java™ programs. Together, these interfaces can provide: extensible client architecture for application-specific requirements; portable client applications; portable and OS-specific plug-ins; encapsulated OS-specific code in reusable components; support for programming in JavaScript, Java™, C and C++; and support for new data types and new data sources.

Various software applications 310 run on top of internet client 305 and preferably include the client-side of software applications built from standard Internet content such as web pages, JavaScript and Java™. In particular, there can also be one or more Java™ applets 311 within a web page. It is these applets with which the present invention is particularly concerned. In particular, the preferred, exemplary embodiment of the invention can be used with any Java™ applet and does not limit the capabilities of the Java applet.

Many stand-alone Java™ applets use multi-threading to provide better interactive responsiveness and real-time performance. Remote control input signals can be accepted and used at any point in the processing. In STB 200, a Java™ applet may perform any function implementable by the STB 200 and its applications software and accept remote control input signals as user inputs. For example, the selectable responses may include input data, entered in real time by the customer and simultaneously displayed on the screen, to which the processing is directed. This advantageously allows processing based on real-time user input from the remote control. The logic in the applications software determines what instruction corresponds to the user response.

The performance of Java™ applets is limited by the underlying platform and input/output system. The method of the present invention allows delivery of remote control inputs without polling and thus improves performance, especially for multithreaded Java™ applets.

An exemplary implementation of the method of the present invention in STB 200 is illustrated in FIG. 5 and here described. The manner of interaction between the Java™ application and the user is not limited (e.g., to a hand-held remote control unit) and may take any form implementable by STB 200 and its accompanying display device and remote control.

In the vast majority of applications, STB 200 will quickly provide or return a response to the input signals. The response may be a mere confirmation of receipt of the input signals and/or a result obtained as a result of execution of the Java™ applet. The response provided may be a simple display. For example, the input signal may correspond and indicate that a user has selected the VCR "play" function on the remote control. The application may then control the display so that a visual indication of "PLAY" appears on the screen. If the input signal is a simple selection of a displayed option (for example, press "1" to perform a function), the application may highlight or otherwise emphasize the option on the screen to indicate that it has been selected. If a prompted response is not received from the user within a predetermined period of time a "time-out" may occur and the Java™ applet may execute default service logic. The default service logic may simply complete the operation in a predetermined manner or it may be custom defined for each customer to, for example, perform a customized default.

Alternatively, a Java™ applet may utilize remote control input signals as data to be processed rather than as a selection signal. For example, an account number may be provided for billing purposes in an electronic commerce application. In such cases, RTOS 302 transfers data representative of the remote control input signals to the applications software so that the processing can be completed in accordance with the user input.

In another alternative (not shown), the Java™ applet may contain routing information and instructions which instruct STB 200 to direct information to the user or to local network 207 so that the user or local network can, in response, provide instructions for matters other than processing in STB 200. The Java™ applet could, for example, accept input for controlling other devices on the local network 207.

An important advantage of the exemplary embodiment is that it enables any Java™ applet developed for STB 200 to utilize remote control input signals from a user by setting up a global reference in API 303 during initialization.

The exemplary method begins when the user provides signals from remote control device 206 which are received by infrared receiver 205 of STB 200 (block 501). The input signals are provided to software driver for infrared receiver 205 in RTOS 302 (block 502). The software driver provides the input signals to a dynamically linked library (DLL) in the API 303 in a known format (block 503). The DLL then calls a method in the Java™ applet, which has previously registered itself with the DLL using a Java™ Native Interface (JNI), to begin to communicate with the Java™ applet in an advantageous manner (block 504). The DLL then passes along the input signals to the Java™ applet (block 505). The Java™ applet can then, for example, call a script in an HTML page to execute application specific logic utilizing the input signals (block 506).

Of course, this method might not be preexisting in RTOS 302 or API 303 and might be added at some time, such as when Java™ applets are installed in STB 200. This can be accomplished by the exemplary initialization routine shown in FIG. 6. First, the Java™ applet registers itself with the DLL by calling a method in the DLL during its initialization procedure (block 601). The applet gives the DLL an object pointer (block 602) which the DLL can use to directly call a method in the applet. When the DLL receives remote control input signals in block 503 above, it uses the stored object pointer to directly call a corresponding method of the Java™ applet in block 504 to thereupon provide the applet with the remote control input signals in block 505. Preferably, a global reference to the Java™ class object is stored (block 603), thereby preventing the object from being destroyed by the Java™ garbage collector.

The method may be carried out in two components which interact with each other. A first exemplary component, shown in FIGS. 7*a*-7*e* (which should be combined to form a single file), is an exemplary file written in C or C++ that implements the DLL which is the interface between the remote control and the high-level Java™ applet. The DLL set by this file interfaces with the remote control hardware through a file provided by the vendor of the remote control hardware. Input signals from the remote control hardware are received by HandleRemoteEven(). Its relevant interfaces are:

RemoteInitialize(): initializes the remote control
RemoteUninitialize(): shuts down the remote control.

The second component is written in Java™. FIGS. 8*a* and 8*b* provide an exemplary program listing of a file that implements a Java™ applet class that interfaces between JavaScript code on an HTML page and the DLL implemented by the file shown in FIGS. 7*a*-7*e*. Input signals from the DLL are received by HandleRemoteKeys(). These signals are then supplied to a JavaScript function RemoteKey() in an HTML page.

There are other exemplary files which implement the link between the files for the DLL shown in FIGS. 7*a*-7*e* and the Java™ applet class in FIGS. 8*a* and 8*b*. There is also a header file associated, and usually provided, with the remote control hardware such as that commercially available from Logitech.

STB 200 includes means to receive selection signals from a user via remote control, and as noted above, RTOS 302 and API 303 responds by delivering the signals to a Java™ applet. STB 200 preferably utilizes standardized interfaces for input signals in order to avoid complex processing in decoding the input signals. While the interface prompting the called party for a response may vary by settop box, a standard message set may be used for the Java™ applet and the messages sent to the applications software are then in compliance with the standard message set.

There may be any number of different software applications installed in STB 200. These could include a tv application, web tv, a virtual CD player, and interactive applications and games. These applications may be open simultaneously. In an exemplary implementation, STB 200 includes a context manager for managing several software applications, each of which are responsive to remote control signals received using the method shown in FIG. 5. In particular, the context manager controls the active/inactive status of the applications so that, when received, the remote control signals are provided to the currently active software application.

Since Java™ is platform independent, the invention is applicable to any video architecture having addressable settop boxes, including, for example, cable TV, hybrid fiber coax, switched digital video network, multi-channel multi-point distribution systems (MMDS), Asymmetrical Digital Subscriber Line (ADSL) or a direct broadcast satellite (DBS) system. In any implementation, the present invention addresses the disadvantages in the related art by utilizing a unique method to deliver remote control inputs to a Java™ applet, which may then perform a variety of different programmed functions in response to the remote control input signals.

In a second embodiment of the invention, a tangible medium stores a program which contains instructions instructing a device to carry out the steps of: receiving the input signals of the remote control in a receiver of the processing device; holding the received input signals in system-specific native code of the processing device; calling an event method in the Java™ application in response to the received input signals; and executing the event method to transfer the input signals from the native code to the Java™ application.

A third preferred embodiment of the invention is directed to a set-top box including: a microprocessor; a real-time operating system; a plurality of input/output devices, including at least an infrared transmitter and infrared receiver for transferring input signals to and from an infrared remote control; and at least one Java™ application responsive to input signals received from the infrared remote control via the infrared receiver, the real-time operating system having a dynamically linked library which traps the received input signals and calls a method in the software application to transfer the input signals to the Java™ application.

Additional variations of the invention may be apparent to those skilled in the art from the detailed description of the exemplary embodiments and claims when read in connection with the accompanying drawings. While the foregoing and following written and illustrated disclosure focuses on disclosing exemplary embodiments of the invention, it should be understood that the same is by way of illustration and example only, is not to be taken by way of limitation and may be modified in learned practice of the invention or as a result of development of technology in the future. While the foregoing has described what are considered to be exemplary embodiments of the invention, it is understood that various modifications may be made therein and that the invention may be implemented in various forms and embodiments, and that it may be applied in numerous applications, only some of which have been described herein. It is intended by the following claims to claim all such modifications and variations.

The invention claimed is:

1. A television appliance processing method comprising:
  receiving input signals from a remote control device;
  providing the input signals to a software driver in a real-time operating system (RTOS) in native code, wherein the software driver employs a dynamically-linked library (DLL);
  using the DLL to invoke a method in an object-oriented programming language application to pass the input signals from the native code to an applet; and
  enabling the applet to call a script in a hypertext markup language (HTML) page to execute application specific logic utilizing the input signals.

2. The method of claim 1, wherein the object-oriented programming language application comprises a Java™ application and the applet comprises a Java applet.

3. The method of claim 1, wherein receiving input signals from a remote control device comprises receiving the input signals from an infrared remote control device by an infrared receiver.

4. The method of claim 1, wherein the DLL asynchronously delivers the input signals to the applet.

5. The method of claim 1, wherein the software driver operates in accordance with a preselected code set to capture the input signals in native code.

6. The method of claim 1, wherein the input signals are accepted by an infrared receiver at any time.

7. The method of claim 1, wherein the input signals are received from the remote control device without being polled.

8. The method of claim 1, wherein the applet comprises a Java applet and the Java applet utilizes the input signals as a selection signal.

9. The method of claim 1, wherein the applet comprises a Java applet and the Java applet utilizes the input signals as data to be processed.

10. The method of claim 1, wherein using the DLL to invoke a method in an object-oriented programming language application to pass the input signals from the native code to an applet comprises the DLL using a stored object pointer to directly invoke the method that passes the input signals from the native code to the applet.

11. The method of claim 10, wherein the stored object pointer provides a global reference to a class object.

12. The method of claim 10, wherein the method is one of a cable box, set-top box (STB), and digital entertainment terminal (DET) appliance processing method.

13. A method comprising:
receiving input signals from a remote control device in a receiver of a processing device;
holding the input signals in system-specific native code of the processing device;
calling an event method in an object-oriented programming language application in response to the input signals; and
executing the event method to transfer the input signals from the native code to the object-oriented programming language application.

14. The method of claim 13, wherein the input signals are asynchronously delivered to the object-oriented programming language application.

15. The method of claim 13, wherein the object-oriented programming language application is a Java™ application.

16. The method of claim 15, wherein the Java application is an applet in a hypertext markup language (HTML) page.

17. The method of claim 16, wherein the event method calls on the applet using a Java Native Interface/Java Remote Interface (JNI/JRI).

18. The method of claim 13, wherein the remote control device comprises an infrared remote control device.

19. The method of claim 13, wherein the processing device is at least part of one of a cable box, set-top box (STB), and digital entertainment terminal (DET) television appliance.

20. The method of claim 13, wherein calling an event method in an object-oriented programming language application in response to the input signals comprises using a stored object pointer to directly call the event method in the object-oriented programming language application in response to the input signals.

21. The method of claim 20, wherein the stored object pointer provides a global reference to a class object to prevent an object from being destroyed by a garbage collector.

22. The method of claim 13, wherein the object-oriented programming language application is a Java application and the Java application is an applet in a HTML page, wherein the method comprises enabling the Java applet to call a script in the HTML page to execute application specific logic utilizing the input signals.

23. An article comprising a tangible media having a plurality of machine accessible instructions that, when executed, cause a processing device to:
provide for receiving input signals from a remote control device in a receiver of a processing device;
hold the input signals in system-specific native code of the processing device;
call an event method in an object-oriented programming language application in response to the input signals; and
execute the event method to transfer the input signals from the native code to the object-oriented programming language application.

24. The article of claim 23, wherein the input signals are asynchronously deliverable to the object-oriented programming language application.

25. The article of claim 23, wherein the object-oriented programming language application is a Java™ application.

26. The article of claim 25, wherein the Java application is an applet in a hypertext markup language (HTML) page.

27. The article of claim 26, comprising instructions for calling the event method in the applet using a Java Native Interface/Java Remote Interface (JNI/JRI).

28. The method of claim 23, wherein the remote control device comprises an infrared remote control device.

29. The article of claim 23, wherein the processing device is at least part of one of a cable box, set-top box (STB), and digital entertainment terminal (DET) television appliance.

30. The article of claim 23, wherein instructions for calling an event method in an object-oriented programming language application in response to the input signals comprises instructions for using a stored object pointer to directly call the event method in the object-oriented programming language application in response to the input signals.

31. The article of claim 30, wherein the stored object pointer provides a global reference to a class object to prevent an object from being destroyed by a garbage collector.

32. The article of claim 23, wherein the object-oriented programming language application is a Java application and the Java application is an applet in a HTML page, comprising instructions for enabling the Java applet to call a script in the HTML page to execute application specific logic utilizing the input signals.

33. A system comprising:
an infrared (IR) remote control device; and
a television appliance wirelessly coupled to the IR remote control device, the television appliance comprising
an IR receiver for receiving input signals from the IR remote control device in native code,
an IR transmitter for transmitting output signals to one or more of a display, a network, and the IR remote control device,
a processor coupled to the IR receiver and the IR transmitter for processing input signals from the IR remote control device, and an interface for enabling the processor to invoke a method in an object-oriented programming language application for transferring the input signals in native code to the object-oriented programming language application.

34. The system of claim 33, wherein the IR remote control device includes the capability to store lines of text, display lines of text, and scroll the displayed lines of text.

35. The system of claim 33, wherein the object-oriented programming language application is a Java™ application, the Java application is an applet in a hypertext markup language (HTML) page, and wherein the processor enables the Java applet to call a script in the HTML page to execute application specific logic utilizing the input signals from the IR remote control device.

36. The system of claim 35, wherein the interface is a Java Native Interface (JNI).

37. The system of claim 33, wherein the television appliance is at least one of a cable box, set-top box (STB), and digital entertainment terminal (DET) appliance.

* * * * *